United States Patent
Rothenberg et al.

(10) Patent No.: US 7,339,727 B1
(45) Date of Patent: Mar. 4, 2008

(54) METHOD AND SYSTEM FOR DIFFRACTIVE BEAM COMBINING USING DOE COMBINER WITH PASSIVE PHASE CONTROL

(75) Inventors: Joshua E. Rothenberg, Los Angeles, CA (US); Robert R. Rice, Simi Valley, CA (US); Sami A. Shakir, Alburquerque, NM (US); Michael G. Wickham, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/543,613

(22) Filed: Oct. 5, 2006

(51) Int. Cl.
*H01S 3/00* (2006.01)

(52) U.S. Cl. .................................. 359/349
(58) Field of Classification Search ............... 359/349
See application file for complete search history.

(56) References Cited

U.S. PATENT DOCUMENTS

| | | | | |
|---|---|---|---|---|
| 5,373,526 A * | 12/1994 | Lam et al. | ............. | 372/69 |
| 5,572,542 A * | 11/1996 | Dixon | ............. | 372/92 |
| 5,629,992 A * | 5/1997 | Amersfoort et al. | ......... | 385/15 |
| 5,694,408 A * | 12/1997 | Bott et al. | ............. | 372/6 |
| 5,717,516 A * | 2/1998 | Klein et al. | ............. | 359/334 |
| 5,835,199 A * | 11/1998 | Phillips et al. | ............. | 356/5.03 |
| 6,192,062 B1 | 2/2001 | Sanchez-Rubio et al. | | |
| 6,208,679 B1 | 3/2001 | Sanchez-Rubio et al. | | |
| 6,317,257 B1 * | 11/2001 | Upton et al. | ............. | 359/349 |
| 6,327,292 B1 | 12/2001 | Sanchez-Rubio et al. | | |
| 6,366,356 B1 | 4/2002 | Brosnan et al. | | |
| 6,480,327 B1 * | 11/2002 | Betin | ............. | 359/338 |
| 6,597,836 B2 * | 7/2003 | Johnson et al. | ............. | 385/33 |
| 6,678,288 B2 * | 1/2004 | Rice | ............. | 372/6 |
| 6,678,294 B1 * | 1/2004 | Komine et al. | ............. | 372/38.01 |
| 6,697,192 B1 | 2/2004 | Fan et al. | | |
| 6,708,003 B1 | 3/2004 | Wickham et al. | | |
| 6,717,719 B1 * | 4/2004 | Moore | ............. | 359/340 |
| 6,724,125 B2 * | 4/2004 | Hung et al. | ............. | 310/309 |
| 6,813,069 B2 * | 11/2004 | Rice et al. | ............. | 359/349 |
| 7,088,743 B2 * | 8/2006 | Rice et al. | ............. | 372/6 |
| 7,212,285 B2 * | 5/2007 | Goto et al. | ............. | 356/328 |
| 7,221,499 B2 * | 5/2007 | Rice et al. | ............. | 359/349 |
| 2003/0062468 A1 * | 4/2003 | Byren et al. | ............. | 250/216 |
| 2005/0035295 A1 * | 2/2005 | Bouma et al. | ............. | 250/341.1 |
| 2005/0135815 A1 * | 6/2005 | Gerwe et al. | ............. | 398/188 |
| 2006/0187537 A1 * | 8/2006 | Huber et al. | ............. | 359/337.22 |

OTHER PUBLICATIONS

Shay, T.M. & Benham, V. "First Experimental Demonstration of Phase Locking of Optical Fiber Arrays by RF Phase Modulation". *Proceedings of SPIE* vol. 5550. pp. 313-319 (2004).

\* cited by examiner

*Primary Examiner*—Deandra M Hughes (57) ABSTRACT

A system and method for combining plural low power light beams into a coherent high power light beam. Optical amplifiers transmit a plurality of light beams propagating at a common wavelength through an array of optical fiber emitters. Each constituent beam is emitted from the array at a different propagation angle, collimated, and incident on a diffractive optical element operating as a beam combiner such that incident beams when properly phased and located are combined into a coherent beam at a desired diffraction order. A beam splitter or a periodic sampling grating on the diffractive optical element directs a low power sample beam to a spatial filter passing resonant mode output back to the optical amplifiers in a ring laser configuration thereby passively synchronizing phases of the constituent beams to maximize combination efficiency of the coherent beam.

20 Claims, 9 Drawing Sheets

METHOD AND SYSTEM FOR DIFFRACTIVE BEAM COMBINING USING DOE COMBINER WITH PASSIVE PHASE CONTROL

This application is related to U.S. Patent Application Publication No. US 2007/0201795 for Coherent Fiber Diffractive Optical Element Beam Combiner filed Feb. 24, 2006; U.S. patent application Ser. No. 11/543,677 for Method And System For Coherent Beam Combining Using An Integrated Diffractive Beam Combiner And Sampler filed concurrently herewith; U.S. patent application Ser. No. 11/543,596 for Method and System For Hybrid Coherent And Incoherent Diffractive Beam Combining filed concurrently herewith; and U.S. patent application Ser. No. 11/543,567 for Multi-Stage Method and System For Coherent Diffractive Beam Combining filed concurrently herewith; all of which are fully incorporated herein by reference.

BACKGROUND OF THE INVENTION

1. Field of the Invention

The present invention relates to combining coherent light beams using passive phasing. More specifically, the invention relates to combining high power lasers into a single coherent beam using a diffractive optical element that diffracts a low power sample of combined beams for use in passive phasing.

2. Description of Related Art

High power lasers have many possible applications. In a military application, sufficient energy focused in a laser beam can provide an effective defensive countermeasure against ballistic projectiles. In a commercial application, a high power laser can be used to weld metal components that are too thick to be welded by conventional methods. To improve the effectiveness of the laser in any of these applications, the power transmitted by the beam may be enhanced by focusing the beam to its far-field diffraction limit, i.e., into as small an area as theoretically possible. A laser beam focused to this theoretical limit is said to be diffraction limited. Generally speaking, advancement of the art of high power lasers is impeded by physical limitations encountered when attempting to achieve this limit.

Lasers by their nature are ideally diffraction limited, such that the smallest possible area of focus is limited by the product of the focal distance and the diffraction limited angle, which is the wavelength of the light divided by the aperture width. Thus, the larger the aperture, the tighter the focus. However, there are practical limitations on the size of an aperture that can be designed for any optical apparatus. Imperfections in the optics may cause degradations in the laser wavefront that affect the focus, and in high power applications, thermal variations contribute to the degradation. This limits the designer's ability to focus the beam, resulting in a focal spot somewhat greater than 1.0 times the diffraction limit (1.0×DL). Practically speaking, the designer's goal is to achieve a near-diffraction-limited laser (i.e., one that approaches 1.0×DL) that operates at as high a power level as possible.

At present, the most advanced near-diffraction-limited laser beams cannot deliver enough power per unit area to serve effectively in high-power applications. In one case, an optimized beam can deliver a 3 kW beam having a diffraction limit of nearly 1.0. In another case, an optimized beam can deliver a 10 to 12 kW beam that is about 1.5 times diffraction limited. An objective of ongoing research in this field is to design a laser generator that can deliver 100 kW or more in a near-diffraction-limited beam.

One method for increasing the power deliverable by lasers is to combine the power of many coherently phased beams of a common wavelength by arranging a plurality of optical fiber emitters in a two-dimensional array. A beam splitter may be placed at the output of the array to sample the constituent beams. Each of the sampled beams is directed to a phase sensor, and the measured error signals are provided to phase modulators in each beam to ensure all the beams have equal phase. However, even in the most tightly packed array, the "fill factor" of the composite beam (ratio of the composite beam power to a beam that uniformly fills the entire array aperture and has equal peak intensity) is only about 70%, due to voids that occur between fibers and also to the Gaussian shape of each beam. The end result is a reduction in brightness by the fill factor ratio—the focused composite beam has a central peak intensity equal to the fill factor ratio times the maximum intensity possible with a uniform beam, with the remaining power appearing in widely separated side lobes. In other words the composite beam has a shape dramatically different than that of the constituent beams, and as a result the composite does not focus as well as the constituents.

Another known method for combining beams is spectral combining, in which many incoherent beams, i.e. beams of different wavelengths, are superimposed. The beams are transmitted through a prism or grating that aligns the beams along a common path, creating, in essence, a singular beam of multiple colors. Thus the composite beam has a shape that is substantially identical to that of the constituent beams. While this technique therefore eliminates the fill factor problem associated with the two-dimensional array, other problems arise from using multiple wavelengths. For one, the complexity of the system increases as each wavelength requires a different oscillator. Furthermore, the propagation angle of each wavelength must be precisely adjusted such that its incidence on the grating is exact, otherwise the beams will misalign. More importantly, each wavelength may behave differently as the beam propagates through various media. Atmospheric absorption is a function of wavelength, therefore a spectrally combined beam directed through air is more susceptible to energy loss than a single-wavelength selected for optimal transmission efficiency. Spectral combining has been proposed, for example, in U.S. Pat. No. 6,697,192, U.S. Pat. No. 6,327,292, U.S. Pat. No. 6,208,679, and U.S. Pat. No. 6,192,062.

Another proposed technique for increasing the power in a laser beam is to (coherently) combine, by constructive interference, a plurality of beams into a single coherent beam. This technique, known as coherent diffractive beam combining, is the subject of co-pending U.S. patent application Ser. No. 11/361,352 filed Feb. 24, 2006, which is incorporated by reference herein as though set forth in full. In general, the co-pending application teaches generating a plurality of input beams, all having a common wavelength, using a master oscillator. Each beam is individually amplified and transmitted through a fiber emitter, and the emitter outputs are combined into a single output beam using a diffractive optical element (DOE). The technique includes a means for actively controlling the phases of the multiple beams using feedback to optimize the efficiency of the beam combination. This may be accomplished by coupling a phase modulator to each input beam, and by coupling a phase detector to a sampling of the output beam. The sampling is obtained by placing a transmissive beam splitter in the output path that reflects a low power portion of the output to the phase detector. Using electronics, correction signals based on phase deviations detected at the output are fed back to the modulators. An exemplary means for effecting active phase control in this fashion is disclosed in U.S. Pat. No. 6,708,003, which is also fully incorporated herein by reference. Another active phase detection and control method has been demonstrated by T. M. Shay et al., Proceedings of the SPIE, Vol. 5550, pp. 313-319 (2004), which is also fully incorporated herein by reference. An advantage of this approach is that, similar to SBC, the combined output beam has a shape that is substantially identical to the composite beams and therefore eliminates the fill factor reduction in the intensity of the focused coherent output beam. However, disadvantages occur when sampling the phases of the high power combined output beams. A high power beam passing through a transmissive beam splitter causes thermal distortion that affects the phase measurement accuracy and focusability of the output beam. Also in this method, a single detector is used to measure the phases of all the constituent beams. For a very large number of combined beams the accuracy of phase measurement becomes more difficult with a single detector.

SUMMARY OF THE INVENTION

The present invention is directed to improvements in coherent diffractive beam combining. A system or method according to the invention combines a plurality of passively phased low power light beams into a coherent high power light beam by means of a diffractive optical element (DOE). A one or two-dimensional array of N optical amplifiers transmits a plurality of light beams through a corresponding array of N optical fiber emitters. The beams that form the output of the emitter array are collimated by means of a collimating optic to form a series of N collimated beams of full aperture, each beam having a slightly different propagation angle determined by the position of fibers in the array. The collimated beams are overlapped and incident upon the DOE, which is preferably a reflective optic. The DOE is configured to operate as an N:1 beam combiner, such that when the N incident beams are properly phased and located, the DOE efficiently combines them into a single coherent beam at a desired diffraction order. In one embodiment, the coherent output beam has a maximum intensity along the $0^{th}$ diffraction order and combines the constituent beams at an optimal combination efficiency greater than 90%. In another embodiment, in lieu of the collimating optic, the DOE surface may be modified with a curved or kinoform shape to collimate beams diverging from the fiber array In one embodiment the coherent output beam may be sampled by a beam splitter optic. In another embodiment, the DOE may be multi-functional and include a periodic sampling grating for diffracting a low power sample beam. Passive phase control is achieved by focusing the sample beam into a single mode fiber or other spatial mode discrimination filter that passes an optimal resonant mode. In another embodiment, the multi-functional DOE periodic sampling grating may be modified to focus the sample beam into the spatial filter. The resultant beam is fed back to the N amplifiers, thereby forming a ring laser configuration providing positive feedback. In this configuration, as the ring laser tends to maximize the round-trip gain, the relative phases of the N beams synchronize. In turn, phase synchronization maximizes the intensity of the output beam through constructive interference of the N constituent beams.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The invention will be better understood upon consideration of the specification and the accompanying drawings, in which like reference numerals designate like parts throughout the figures, and wherein:

DETAILED DESCRIPTION OF THE PREFERRED EMBODIMENTS

Passively Phased Coherent Diffractive Beam Combining

A coherent diffractive beam combining method has been proposed in co-pending U.S. patent application Ser. No. 11/361,352 by inventors named in the present application. In general, the diffractive beam combining method employs a DOE to enable the coherent combination of the output of a plurality of fiber amplifiers transmitting laser beams derived from a common oscillator. The beam combination method requires active phasing of the outputs from the fiber amplifiers to lock the phases of the output beams in order to optimize intensity of the composite beam by means of constructive interference. Active phasing is achieved by placing a beam splitter in the path of the composite beam that is diffracted by the DOE. The beam splitter produces a low power sample of the composite beam, and the sample is focused onto a phase detector. In the phase detector, the output phase of each constituent beam is detected by decoding signals that are encoded on each constituent beam. Using electronics, the phases are measured by comparison to reference signals from the master oscillator, and correction signals derived from this comparison are fed back to phase modulators in a low power section of each fiber amplifier to achieve optimal phasing.

A beam combining method using passively phased fiber amplifiers is disclosed in U.S. patent application Ser. No. 11/015,671 filed Dec. 20, 2004, the entire disclosure thereof incorporated herein by reference. Passive phasing is achieved by placing a beam splitter in the path of a beam emitted from an array of fiber amplifiers. The beam splitter directs a small fraction of the composite beam to an aperture or coupling hole, which serves as a spatial filter. The output of the filter is coupled back to the input of each amplifier in the array. This creates positive feedback, causing the system to rapidly converge on a resonant mode with optimal spatial mode quality, thus synchronizing the phases of constituent beams that form the composite output.

A DOE employed in a diffractive beam combining apparatus using passive phase control according to the present invention is now described. In a system using passive phase control, the fiber laser array is arranged in a ring configuration to exploit self-optimizing characteristics of positive feedback. Optical fiber amplifiers have a certain bandwidth over which they provide gain. Feedback is provided in a ring configuration by coupling a sample of the output beam back to the input. Thus, given gain and feedback, the system tends to oscillate at one or more resonant modes. The frequency that has optimal phasing will experience the highest gain and will drive the circuit into saturation and suppress all other modes. Refer to U.S. patent application Ser. No. 11/015,671 for further detail regarding passive phasing of fiber amplifiers. One main advantage of passive phase control is greater simplicity, in that the master oscillator, the phase modulators, and the electronics used for phase control, as described in U.S. patent application Ser. No. 11/361,352, are not required.

Figure 1:
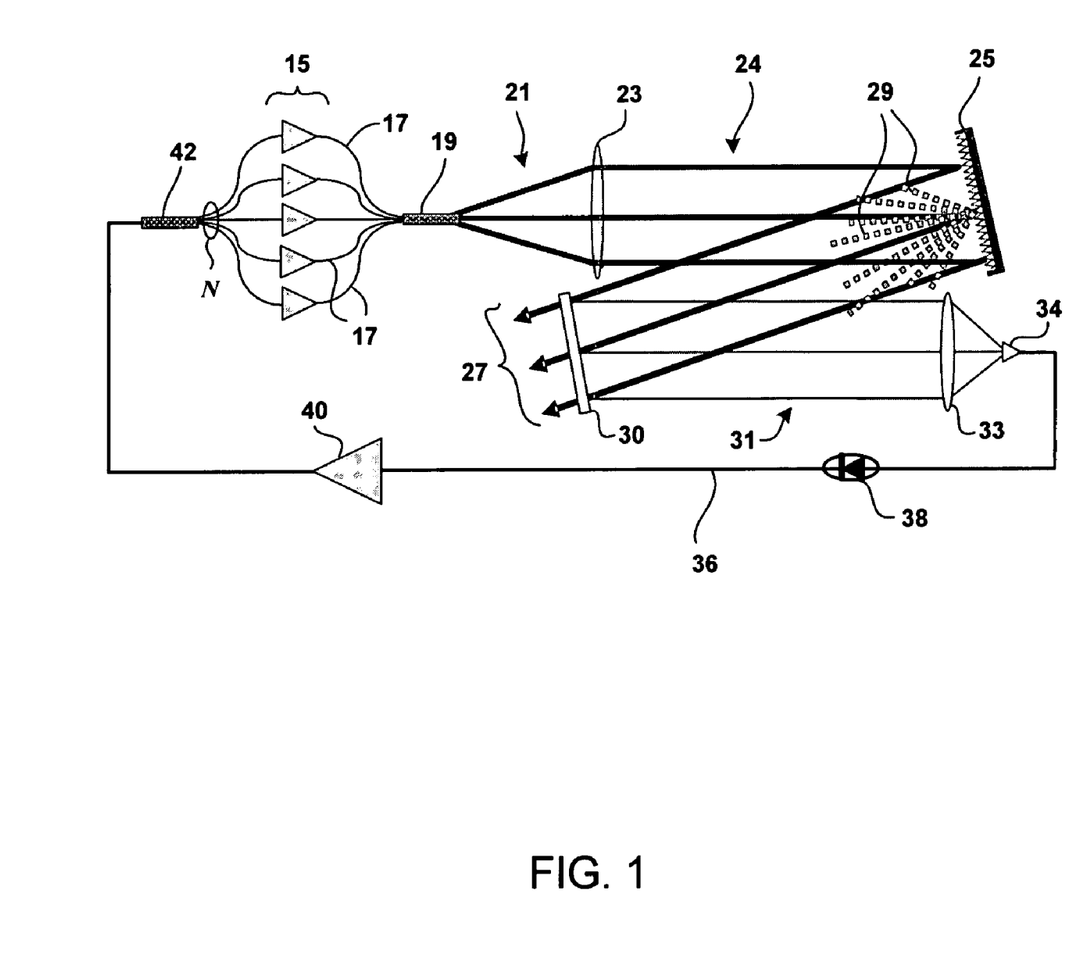
FIG. 1 is a block diagram of one embodiment of a system according to the invention employing a DOE combiner with passive phase control.

FIG. 1 shows an embodiment of an apparatus for diffractive beam combining according to the invention. The optical circuit in this embodiment uses passive phase control in conjunction with a DOE that functions as a beam combiner. Multiple (N) fiber amplifiers 15 are coupled and passively phased through a ring laser configuration. The N outputs of amplifiers 15 are coupled to fiber emitters 17, which are arranged in a tiled or side-by-side one-dimensional or two-dimensional array 19. In one embodiment, fiber emitters 17 are selected to transmit beams of like polarization. This particular diagram shows five optical amplifiers 15 corresponding to five fiber emitters 17, i.e. N has a value of 5. However, it should be appreciated that other embodiments are possible wherein N may assume any integer value.

Divergent light beams 21 emerging from array 19 are collimated by a single reflective or transmissive collimating optic 23, thereby forming a series of N collimated beams of full aperture with slightly differing propagation angles, appropriately determined by the spacing of fibers or other emitters in the array 19. These N beams are overlapped and incident upon a properly designed DOE 25 employed as a beam combiner. The propagation angle of each of the N beams emerging from array 19 is precisely set to ensure alignment along a selected diffraction order direction of DOE 25, such that the intensity of the composite output beam 27 of DOE 25 is maximized along a single diffraction order. In one embodiment, intensity of output beam 27 is maximized along the $0^{th}$ diffraction order. Some amount of spurious diffracted output beams 29 of minimal intensity also emerge from DOE 25.

DOE 25 operates as a highly efficient 1:N beam splitter when one beam is incident, and may therefore operate as a highly efficient N:1 beam combiner when N beams are incident. That is, if the incident beams have the proper relative phase as determined by the design of DOE 25, a single combined beam may be formed with very high efficiency, i.e. >>90%.

Due to differences in the lengths of fibers in array 19, and to variations caused by vibrations and temperature fluctuations, slight variations in phase may occur in each of the N beams 21 emerging from the array. These phase variations transfer to sample beam 31. The present invention corrects these variations using a ring oscillator, which provides a passive feedback loop to lock the phases of beams 21 and ensure maximum efficiency in a coherent output. In one embodiment, the feedback loop may include one or more of a beam splitter 30, optic 33, aperture 34, single mode fiber 36, optical isolator 38, pre-amplifier 40, and fiber splitter 42.

In the embodiment of FIG. 1, beam splitter 30 may be placed in the path of composite beam 27 to produce a sample beam 31, which represents a low power analog of composite beam 27 including any uncorrected phase variations. Beam splitter 30 directs sample 31 to an appropriate optic 33 (e.g. a lens or curved mirror). Optic 33 directs or focuses sample beam 31 to a filtering aperture 34, which couples the beam to single mode fiber 36. In another embodiment, a suitably discriminatory pinhole filter may be used for spatial mode selection in place of single mode fiber 36. Sample beam 31 may then be coupled through optical isolator 38 to pre-amplifier 40, split through fiber splitter 42, and injected back into the N amplifiers 15 to complete the ring.

Through positive feedback, the ring oscillator attempts to maximize the round-trip gain, thus, it will passively self-optimize such that the relative phases of the N beams maximize the intensity of the combined output beam 27, thereby maximizing the intensity of the feedback. This optimizes the efficiency of the ring oscillator, such that in an ideal case the output power of the single combined beam 27 will be the sum of the individual beam powers reduced only by the very high efficiency of DOE 25. In addition, because DOE 25 sums incident beams coherently, the ring laser configuration attempts to optimize the polarization of all the beams to be identical, which is required for the maximum efficiency of combination. Alternatively, polarization control may be achieved by other means, such as by using polarization maintaining fiber and appropriately adjusting polarization rotation optics in the ring laser.

Figure 2:
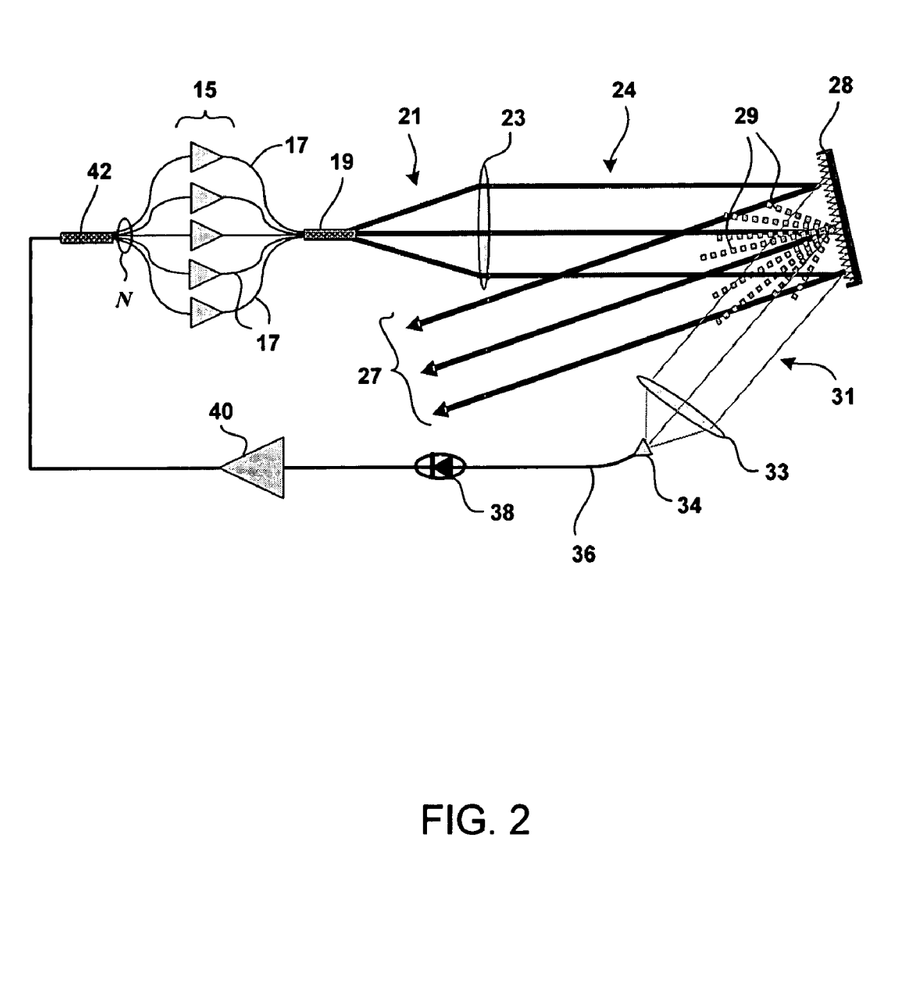
FIG. 2 is a block diagram of another embodiment of a system according to the invention employing a DOE with a sampling grating in combination with passive phase control.

FIG. 2 illustrates another embodiment of a passively-phased beam combiner according to the invention. This embodiment operates in a manner very similar to the system of FIG. 1, except that DOE 28 include an integral means for diffracting a low power sample 31 of output beam 27 into a passive feedback path. In one embodiment, the low power diffracting means may be a highly reflective layer over-coated upon a weak grating (not shown) etched on the surface of DOE 28. The weak grating generates the desired coherent diffracted sample 31. Thus, DOE 28 may be a single optic with dual functions: combining plural input beams into a coherent output beam, and diffracting a low power sample of the coherent output. The dual-function DOE eliminates the need for placing a beam splitter in the output path to effect beam sampling. If a separate transmissive element such as a beam splitter 30 is used for sampling, heat accumulating inside the element may tend to deform its optical characteristics. This may lead to distortions in the output beam that render it less focusable. Generally speaking, minimizing the number of elements in the optical circuit better enables the system to achieve the diffraction limit.

Figure 3:
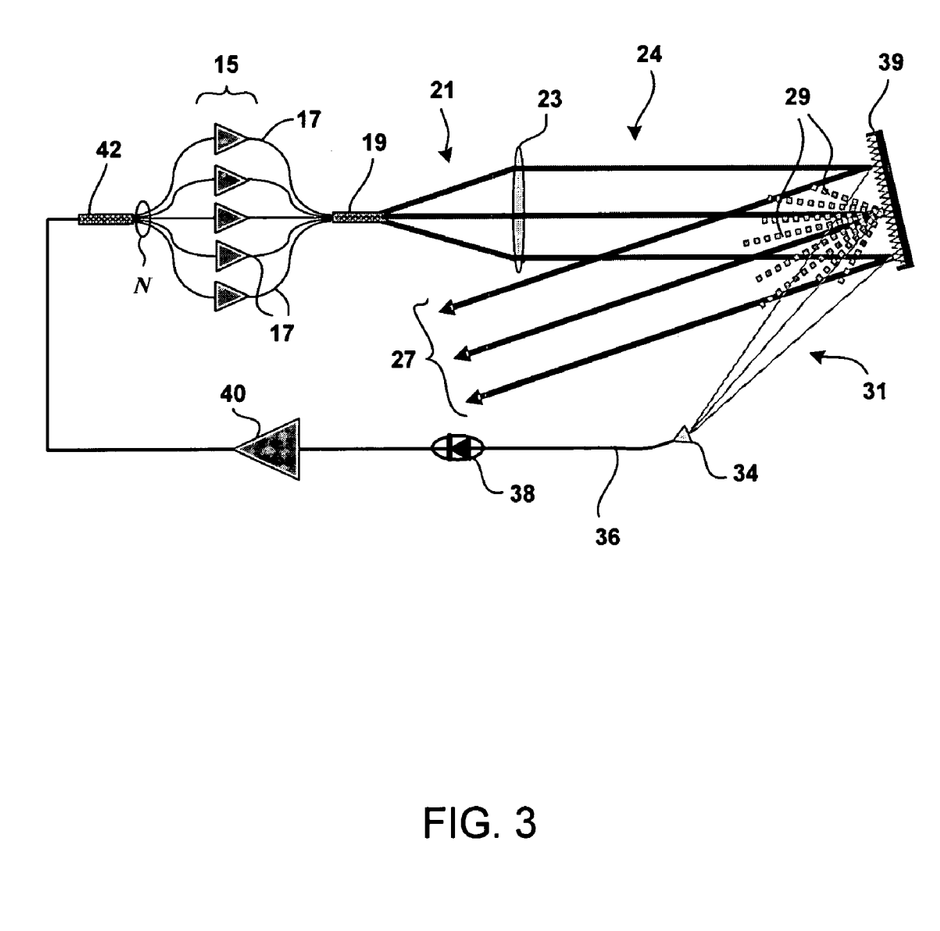
FIG. 3 is a block diagram of another embodiment of a system using a DOE that includes a focusing element for a sample beam used for passive phase control.

Another embodiment of a system according to the invention is shown in FIG. 3. This system eliminates the need for a separate optic to focus the sample beam into the feedback fiber. Here, a dual-function DOE 39 includes a weak sampling grating designed to produce a low power sample 31 of the output beam, and also to focus sample beam 31 to filter 34 for coupling into single-mode fiber 36. In the design of DOE 39, a focusing sampling grating may consist of grooves in the shape of rings rather than a simple array of parallel grooves. Ring-shaped grooves may be formed holographically by the interference of a plane wave and a point source located at the desired focal point.

Figure 4:
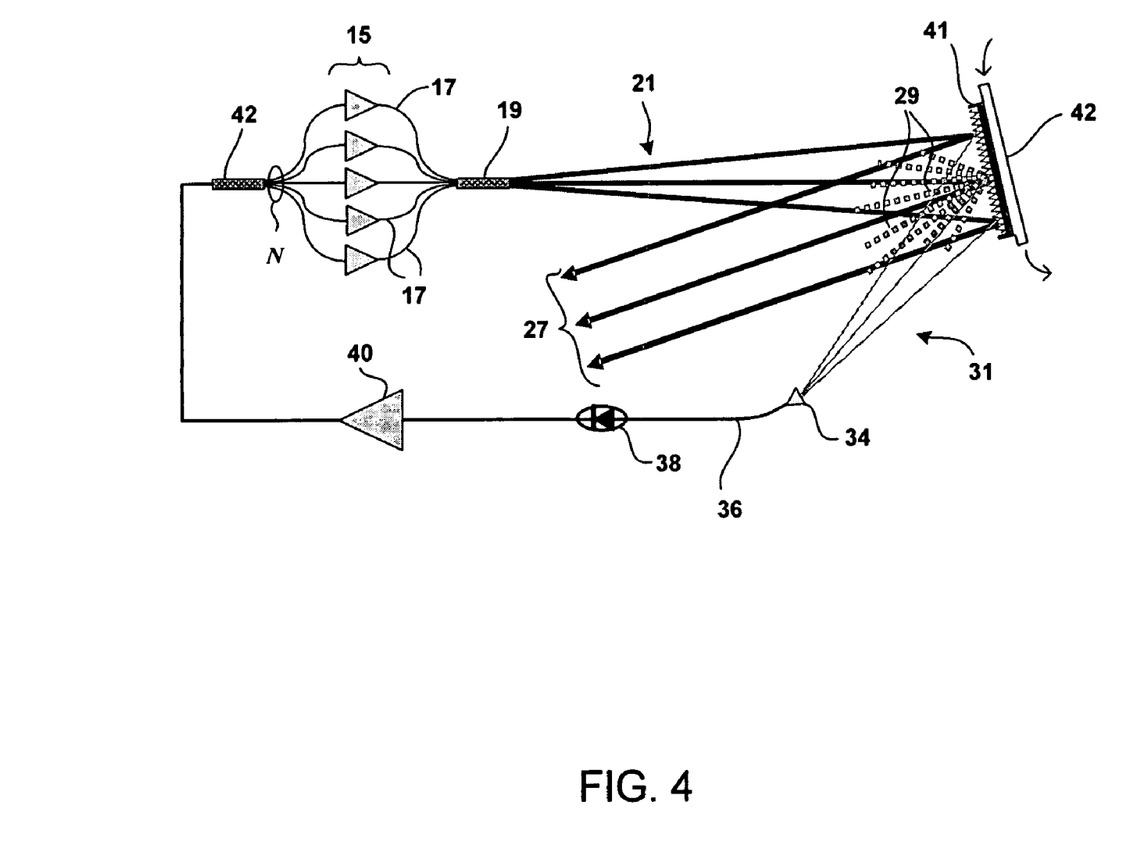
FIG. 4 is a block diagram of another system according to the invention that employs passive phase control and a DOE that combines sampling, focusing, and collimating elements.

FIG. 4 illustrates an additional simplification that may be achieved in a passively phased diffractive beam combining system according to the invention. This embodiment uses passive phase control similar to the embodiments of FIGS. 1-3. However, in this embodiment, a DOE 41 is configured to perform the following functions: (i) collimating input beams 21, (ii) combining the input beams into a coherent output beam 27, (iii) diffracting a low power sample beam 31 of the coherent output, and (iv) focusing sample beam 31 for coupling into single-mode fiber 36. An advantage of this embodiment is that no collimation optic is required for the fiber array. Thus, a single multi-function DOE 41 may be the only optical element in the system.

One method for manufacturing a DOE 41 is to fabricate it on an appropriately curved substrate. Alternately, the DOE could be designed with an additional phase variation of a kinoform lens. As is well known in the art, the kinoform is a curved shape fabricated modulo phase of a multiple of $2\pi$.

Throughout the disclosure, the various DOEs depicted in the figures are modeled as primarily reflective optical elements. In one preferred embodiment, the DOE comprises a highly reflective dielectric stack on it surface having greater than 99% reflectivity to minimize power absorption. Alternatively, any DOE described herein may be fabricated as a transmissive element. However, reflective elements are preferred primarily because the non-reflecting side of a reflective element may be configured for cooling without introducing material into the optical path. In the example of FIG. 3, DOE 41 is shown with an optional cooling means 42 abutting the non-reflecting side. Cooling means 42 may be any type of heat sink suitable for removing heat from DOE 41 to ensure optical stability. For example, cooling means 42 may be a finned metal heat sink contacted to the DOE by an adhesive with high thermal conductivity, a surface exposed to forced air, a conduit for the flow of coolant such as water, or a combination of any of the foregoing.

Figure 5:
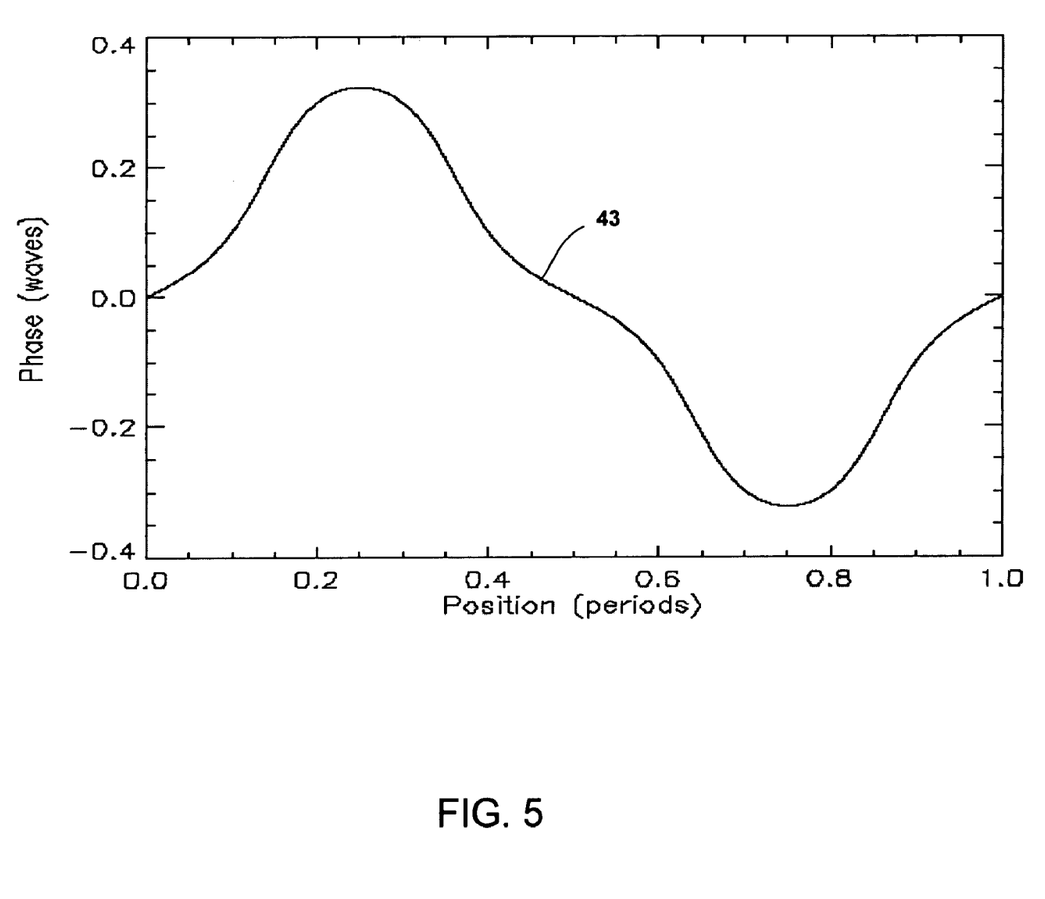
FIG. 5 is a plot of one example of a periodic phase pattern in a five-beam combiner DOE for splitting a single beam into five diffraction orders.
Figure 6:
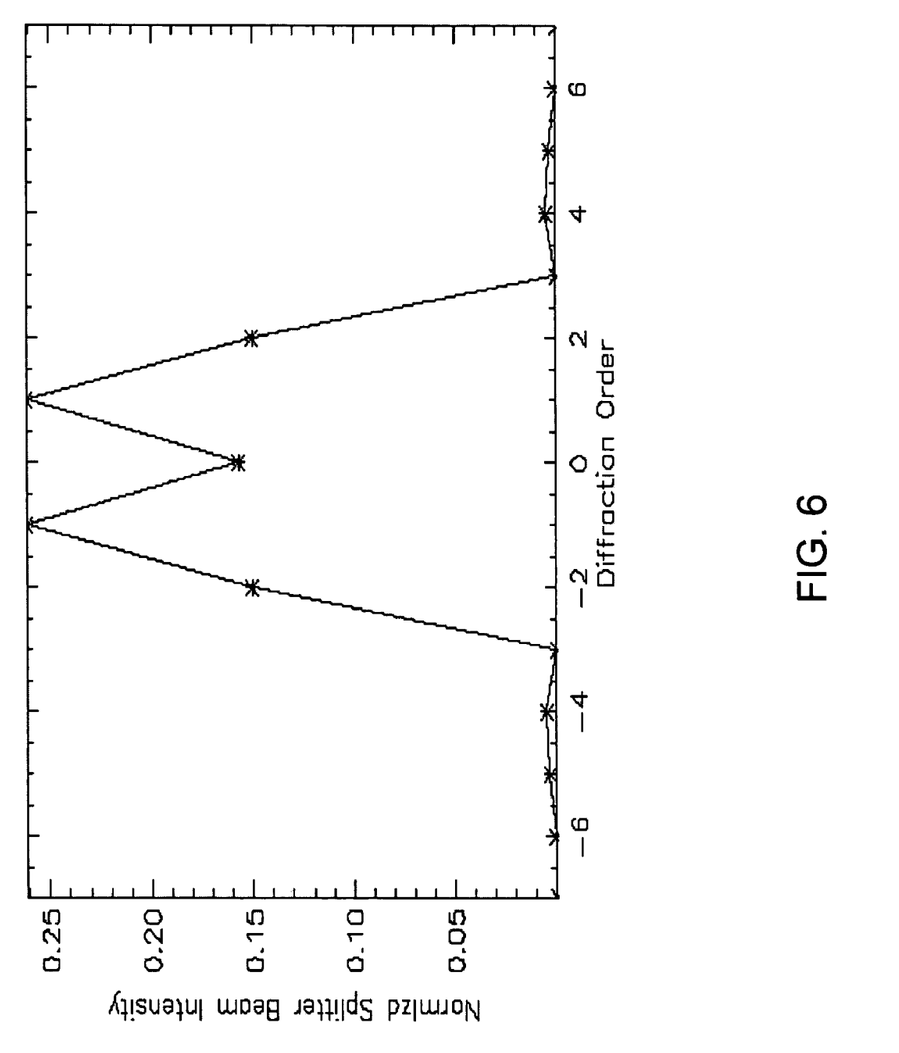
FIG. 6 is a plot showing normalized intensities of the five diffraction orders produced by the DOE of FIG. 5, when used as a beam splitter.

To further illustrate a DOE design appropriate for use in the foregoing embodiments, consider a simple DOE that splits a single beam into five diffracted beams in a 1D array. This simplified example is presented for illustration purposes only. DOEs can be designed to efficiently combine or split an arbitrarily large number of beams, in 1D or 2D arrays. The subject DOE has a pattern of parallel precisely-shaped main grooves etched on its surface, which upon reflection or transmission produces the 1D periodic phase pattern 43 plotted in FIG. 5 in waves (one wave equals $2\pi$ radians). For a reflective or transmissive DOE one wave of phase corresponds to an etch depth of $\lambda/2$ or $\lambda/(n-1)$, respectively, where n is the index of refraction of the DOE substrate and $\lambda$ is the wavelength. Thus, the phase pattern 43 corresponds to an appropriately scaled etch depth pattern on the DOE surface. If a single beam is incident on this DOE, approximately 98% of the power is split among five diffracted orders in a linear array. The remaining approximate 2% of power is distributed among spurious output beams diffracted at higher orders. A normalized plot of the distribution of the beam intensity among all diffracted orders is shown in FIG. 6. Note that the angles of the diffracted orders of the DOE are given by the usual grating equation. For an input beam at normal incidence the diffracted angle of the $m^{th}$ order is $$\sin \theta_m = m\lambda/P \qquad (1)$$

where $\lambda$ is the wavelength and P is the period of the phase pattern on the DOE.

Figure 7:
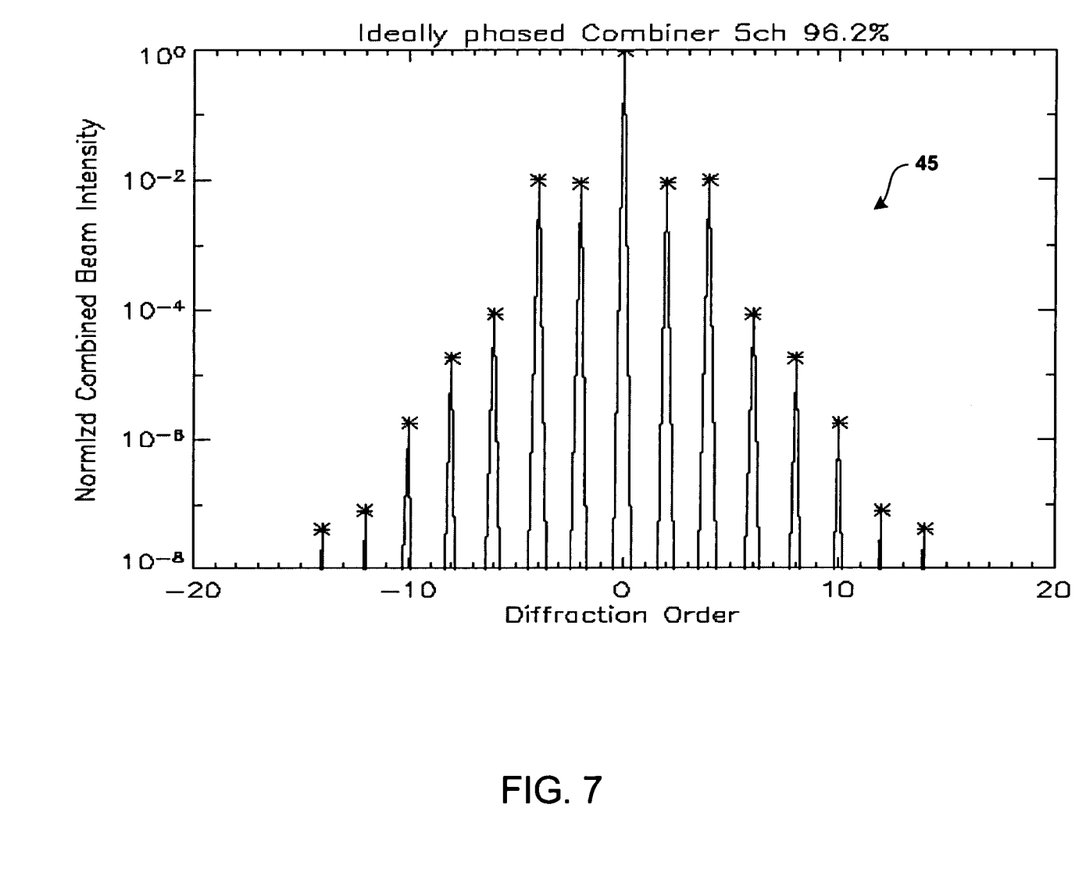
FIG. 7 is a logarithmic plot of normalized intensities vs. diffraction orders resulting when the DOE of FIG. 5 is used to combine five ideally phased beams.

Coherent beam combining is achieved by using the DOE "in reverse". That is, if in the foregoing embodiments, the N=5 input beams are properly phased and pointed and have equal power, the DOE is designed to provide optimal efficiency of combination at about 96%. This efficiency is shown by the normalized intensities 45 of the diffracted orders plotted in FIG. 7. In this example, the desired output beam is the $0^{th}$ diffracted order, which has an intensity about two orders of magnitude higher than the intensity of any other diffraction order, as shown. In another embodiment, when the relative powers of the input beams are adjusted to match the distribution of FIG. 7, the DOE provides an optimal combination efficiency equal to the splitting efficiency of about 98%.

Figure 8:
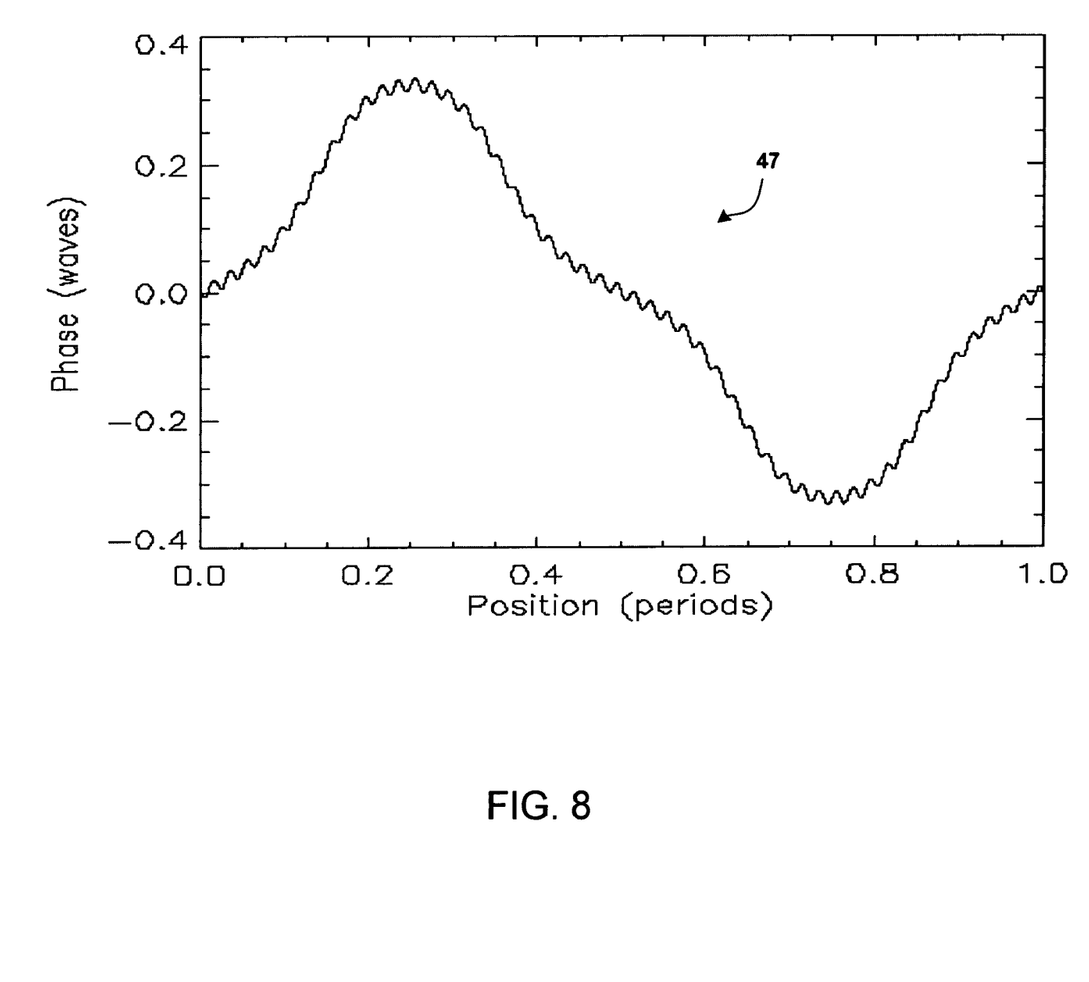
FIG. 8 is a plot of another example of a periodic phase pattern in a five-beam combiner DOE having an added sinusoidal sampling grating.
Figure 9:
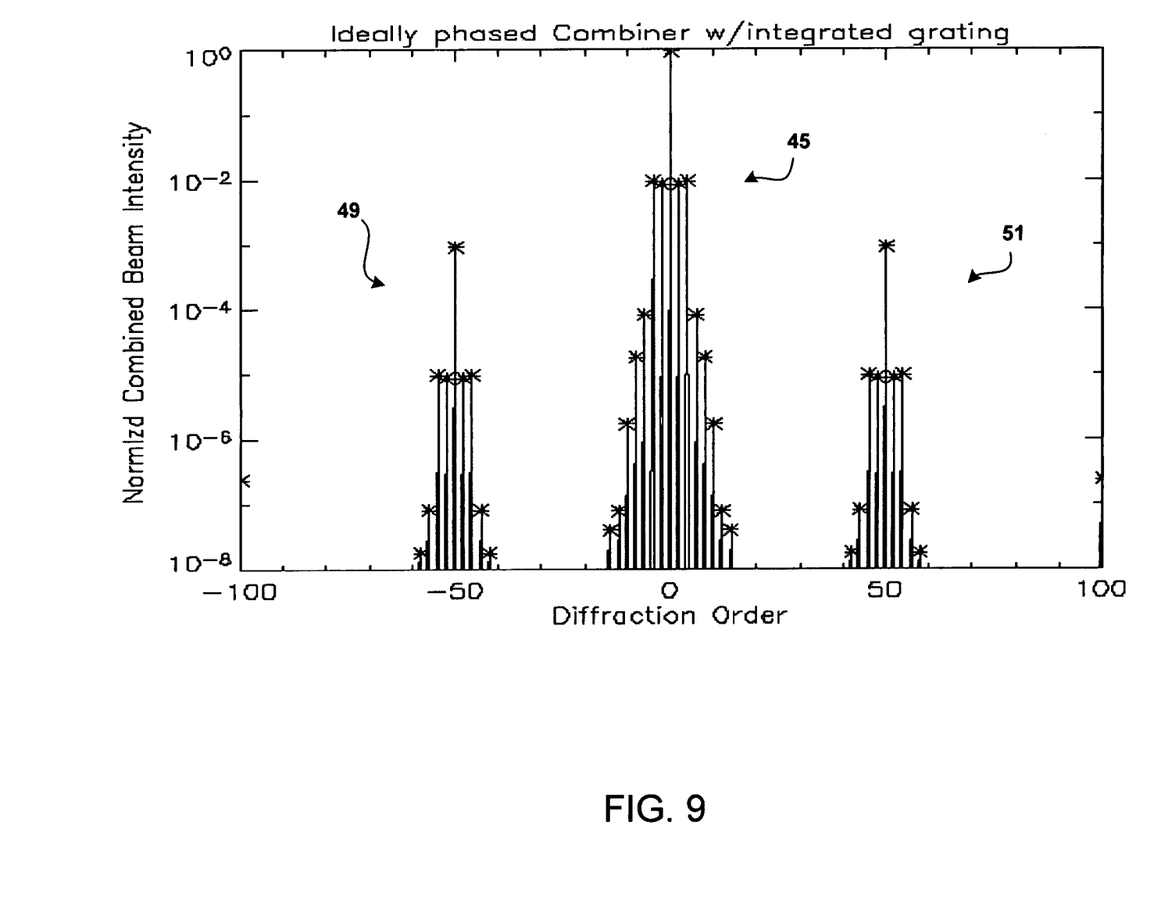
FIG. 9 is a logarithmic plot of normalized intensities of diffraction orders resulting when the DOE of FIG. 8 is used to combine five ideally phased beams.

FIGS. 8-9 illustrate the sampling capability of a DOE. In one embodiment, the design of the five-beam combiner DOE of FIG. 6 may be modified by adding a weak, short-period sinusoidal sampling grating. The peak-to-peak phase value of this particular sampling grating is selected as $\frac{1}{50}^{th}$ of a wave. A plot of the phase of the modified DOE with sampling grating is shown in FIG. 8. Here, the resulting phase pattern 47 appears as the short-period sinusoid superimposed on periodic phase pattern 43. When properly aligned to the modified DOE, ideally phased input beams are diffracted to produce the output shown in FIG. 9. Note that in FIG. 9, the central group of diffraction order intensities 45 centered about the $0^{th}$ order is the same relative distribution of intensities shown in the plot of FIG. 6. The left-hand diffraction order intensities 49, and right-hand diffraction order intensities 51, are centered about the $-50^{th}$ and $+50^{th}$ orders, respectively. Each of these intensity groups 49 and 51 provides a low-power representation of the distribution of intensities 45.

The DOE embodiment illustrated in FIGS. 8-9 has sampling grating grooves situated in parallel to the main grooves and therefore the sampled beam is in the same plane as the fiber array and spurious diffracted output beams. The period of the sampling grating in this example is taken to be $\frac{1}{50}^{th}$ of the DOE combiner period, and thus the beam sample is diffracted at an angle corresponding to the $\pm 50^{th}$ diffracted order of the combiner. As shown in FIG. 9, the sampled beam diffraction order intensities 49 and 51 are well separated from the spurious diffracted orders of the DOE combiner function. Skilled artisans should recognize that many other DOE embodiments are possible, wherein a sampling grating comprising a set of grooves is applied in any direction relative to the DOE combiner function such that the sampled beam departs the DOE in any convenient direction.

In the foregoing example, the sampling grating phase depth is selected to be $\frac{1}{50}^{th}$ of a wave. As a result, the sample intensity in either of the two $\pm 50^{th}$ sampled orders is approximately $1 \times 10^{-3}$ of the main ($0^{th}$ order) output beam. As shown in FIG. 9, each of the primary sampled $\pm 50^{th}$ orders provides an identical low power copy of the fully combined beam. In general, a weak sinusoidal phase grating can be adjusted according to a desired sample fraction of approximately $2.5\phi^2$, where $\phi^2$ is the peak-to-peak phase amplitude of the grating measured in waves. The sinusoidal shape of a sampling grating leads to equal sampled beam intensities in both ±50$^{th}$ orders. In other embodiments of a DOE sampling grating, a "blazed" (i.e. more triangular) shape can be used to preferentially diffract light primarily into one of these orders, as is well understood in the grating art. However, for very high power applications, it may be necessary for the surface of the DOE to be etched more smoothly without any precipitous jumps. This advantageously allows the etched DOE to be over-coated with a very high reflectivity, low-absorption multilayer stack that conforms well and preserves the precise surface shape of the DOE.

It should be appreciated that many advantages arise from combining beam splitting and beam sampling functions into a single optical element. A system employing such an optic minimizes the total number of elements in the optical path. This simplifies system construction and alignment of the elements within the system. Having fewer optical elements in the system also reduces the probability of introducing distortion in the optical signal, which leads to better combination efficiency and higher intensity in the output beam. In high-power laser systems, the integrated DOE combiner and sampler also simplifies heat removal. In one respect, heat removal is simplified because the heat energy accumulates on fewer elements. In another respect, the reflective characteristic of the DOE combiner/sampler allows heat transfer through the non-reflective side. In large scale systems, a weight reduction advantage is also achieved through component minimization.

The invention has been presented in an illustrative style. The terminology employed throughout should be read in an exemplary rather than a limiting manner. While various exemplary embodiments have been shown and described, it should be apparent to one of ordinary skill in the art that there are many more embodiments that are within the scope of the subject invention. Accordingly, the invention is not to be restricted, except in light of the appended claims and their equivalents.

What is claimed is:

1. A system for combining a plurality of light beams into a single coherent beam, comprising:
    a plurality of optical amplifiers, each transmitting a light beam at a common wavelength;
    an array of optical emitters, each emitter in the array coupled to one of the optical amplifiers;
    a diffractive optical element combining light beams emitted from the optical emitters into a coherent output beam;
    a means for generating a sample beam from the coherent output beam;
    a spatial filter passing an optimal mode of the sample beam; and
    feedback fiber coupling output of the spatial filter to the optical amplifiers in a ring laser configuration.

2. The system of claim 1 wherein the fiber coupling output of the spatial filter to the optical amplifiers is polarization maintaining.

3. The system of claim 1 wherein the fiber coupling output of the spatial filter to the optical amplifiers further comprises polarization rotation optics.

4. The system of claim 1 wherein the coherent output beam has a maximum intensity at the optimal mode.

5. The system of claim 1 wherein the coherent output beam has a maximum intensity along the 0$^{th}$ diffraction order of the diffractive optical element.

6. The system of claim 1 wherein the diffractive optical element collimates light beams emerging from the array.

7. The system of claim 1 wherein the means for generating the sample beam comprises a beam splitter.

8. The system of claim 1 wherein the diffractive optical element further comprises the means for generating the sample beam.

9. The system of claim 8 wherein the diffractive optical element focuses the sample beam onto the spatial filter.

10. The system of claim 1 wherein the spatial filter comprises a single mode fiber.

11. The system of claim 1 wherein the spatial filter comprises a pinhole filter.

12. A system for combining a plurality of laser beams into a coherent laser beam, comprising:
    a plurality of optical amplifiers;
    an array of optical emitters, each emitter in the array coupled to one of the optical amplifiers, each emitter transmitting a constituent laser beam at a common wavelength, each constituent laser beam having a different propagation angle with respect to the array;
    a diffractive optical element combining the constituent laser beams emitted from the array into a coherent laser beam at an optimal phase for maximum combination efficiency, the diffractive optical element having a short periodic sampling grating for diffracting a coherent sample beam representing relative intensities of all diffracted orders of the coherent laser beam;
    a single mode fiber passing an optimal spatial mode of the coherent sample beam; and
    feedback fiber coupling output of the single mode fiber to the optical amplifiers in a ring laser configuration.

13. A method for combining a plurality of light beams into a single coherent beam, comprising:
    transmitting an array of light beams at a common wavelength from a plurality of optical amplifiers;
    combining the light beams by means of a diffractive optical element into a coherent output beam;
    sampling the coherent output beam to obtain a coherent sample beam;
    directing the coherent sample beam to a spatial filter;
    passing an optimal spatial mode of the coherent sample beam through the spatial filter; and
    feeding back the optimal spatial mode in a ring laser configuration to the optical amplifiers to maximize combination efficiency in the coherent output beam.

14. The method of claim 13 further comprising, prior to the combining step, directing the light beams through a fiber array to the diffractive optical element.

15. The method of claim 13 further comprising collimating the light beams transmitted from the optical amplifiers by means of the diffractive optical element.

16. The method of claim 13 wherein the coherent output beam has a maximum intensity along the 0$^{th}$ diffraction order of the diffractive optical element.

17. The method of claim 13 further comprising sampling the coherent output beam by means of the diffractive optical element.

18. The method of claim 17 further comprising focusing the coherent sample beam by means of the diffractive optical element.

19. The method of claim 13 further comprising combining the light beams into a coherent output beam and a coherent sample beam by means of a primarily reflective diffractive optical element.

20. The method of claim 13 wherein the spatial filter comprises a single mode fiber.

* * * * *